United States Patent
Riedy et al.

(10) Patent No.: US 9,660,878 B2
(45) Date of Patent: May 23, 2017

(54) MANAGING FABRIC PRIORITIES ACROSS HETEROGENEOUS SERVER PLATFORMS

(71) Applicant: International Business Machines Corporation, Armonk, NY (US)

(72) Inventors: Dale F. Riedy, Poughkeepsie, NY (US); Peter B. Yocom, Lagrangeville, NY (US); Harry M. Yudenfriend, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 40 days.

(21) Appl. No.: 14/211,134

(22) Filed: Mar. 14, 2014

(65) Prior Publication Data
US 2015/0264127 A1 Sep. 17, 2015

(51) Int. Cl.
*H04L 12/24* (2006.01)
*H04L 29/08* (2006.01)

(52) U.S. Cl.
CPC ...... *H04L 41/5022* (2013.01); *H04L 41/5019* (2013.01); *H04L 67/1014* (2013.01)

(58) Field of Classification Search
CPC ....... H04L 1/00; H04L 1/0001; H04L 1/0015; H04L 1/0017; H04L 1/0078; H04L 29/00; H04L 29/02; H04L 41/00–41/0206; H04L 41/022; H04L 41/0226; H04L 41/0233; H04L 41/08–41/0806; H04L 41/0813–41/0886; H04L 41/12; H04L 41/50–41/5016;

(Continued)

(56) References Cited

U.S. PATENT DOCUMENTS 5,615,254 A * 3/1997 Qiu .................. H04Q 3/66
  379/221.01
5,831,985 A 11/1998 Sandorfi
  (Continued)

FOREIGN PATENT DOCUMENTS

WO 2013114463 A1 8/2013

OTHER PUBLICATIONS

Currey—The Real-Time CORBA Specification Feb. 1, 2002.*
Jacob—Why Multiprocessor Systems Need COBRA—Jan. 7, 2007.*
Sharma—Notes on Amazon Redshift—Apr. 28, 2013.*

*Primary Examiner* — Brian J Gillis
*Assistant Examiner* — Boris Grijalva Lobos
(74) *Attorney, Agent, or Firm* — Cantor Colburn LLP; William A. Kinnaman, Jr.

(57) ABSTRACT

Embodiments relate to facilitating a plurality of heterogeneous hosts to use a range of priority values. A method of facilitating a plurality of heterogeneous hosts to use a range of priority values is provided. The method retrieves a plurality of priority ranges from a plurality of network forwarding elements shared by a plurality of heterogeneous hosts. The network forwarding elements provide access to a set of storage devices that stores data for the plurality of heterogeneous hosts. The method generates, by a computer that comprises one of the heterogeneous hosts, a universal priority range from the plurality of priority ranges. The method maps a plurality of workloads performed by the computer to priority values in the universal priority range. The method sends the universal priority range to at least one other host of the heterogeneous hosts.

20 Claims, 3 Drawing Sheets

(58) Field of Classification Search
CPC ........................ H04L 41/5019–41/5025; H04L 41/5041–41/5048; H04L 41/5054; H04L 43/00; H04L 43/08; H04L 43/16; H04L 49/00; H04L 49/55; H04L 65/00; H04L 65/80; H04L 67/00; H04L 67/34
See application file for complete search history.

(56) References Cited

U.S. PATENT DOCUMENTS

| | | | | |
|---|---|---|---|---|
| 5,845,116 | A * | 12/1998 | Saito | G06F 9/4862 718/103 |
| 6,049,531 | A * | 4/2000 | Roy | H04L 29/06 370/352 |
| 6,345,287 | B1 * | 2/2002 | Fong | G06F 9/4881 718/102 |
| 6,718,361 | B1 * | 4/2004 | Basani | H04L 67/1095 707/999.01 |
| 7,395,537 | B1 * | 7/2008 | Brown | G06F 17/30306 707/999.001 |
| 7,502,366 | B1 * | 3/2009 | Erimli | H04L 47/10 370/389 |
| 7,558,775 | B1 * | 7/2009 | Panigrahy | H04L 45/7457 |
| 8,763,000 | B2 * | 6/2014 | Jackson | G06F 9/505 718/100 |
| 2002/0141343 | A1 * | 10/2002 | Bays | H04L 41/0893 370/235 |
| 2003/0189935 | A1 | 10/2003 | Warden et al. | |
| 2004/0114608 | A1 * | 6/2004 | Rao | H04L 29/06 370/396 |
| 2004/0199632 | A1 * | 10/2004 | Romero | G06F 9/5077 709/226 |
| 2006/0095686 | A1 * | 5/2006 | Miller | G06F 3/0611 711/151 |
| 2006/0179438 | A1 * | 8/2006 | Jackson | G06F 9/4881 718/104 |
| 2006/0179439 | A1 * | 8/2006 | Jones | G06F 9/3814 718/105 |
| 2006/0262737 | A1 * | 11/2006 | Livet | H04L 45/302 370/254 |
| 2009/0178042 | A1 * | 7/2009 | Mehta | G06F 9/4881 718/101 |
| 2010/0162036 | A1 * | 6/2010 | Linden | G06F 11/181 714/4.11 |
| 2011/0286465 | A1 * | 11/2011 | Koodli | H04W 68/00 370/401 |
| 2012/0120880 | A1 * | 5/2012 | Lee | H04W 72/02 370/329 |
| 2014/0222873 | A1 * | 8/2014 | Nakadai | G06F 17/30339 707/803 |
| 2014/0348161 | A1 * | 11/2014 | Koponen | H04L 45/64 370/389 |
| 2015/0071123 | A1 * | 3/2015 | Sabaa | H04L 67/1004 370/255 |

* cited by examiner

MANAGING FABRIC PRIORITIES ACROSS HETEROGENEOUS SERVER PLATFORMS

BACKGROUND

The present invention relates generally to storage area networks, and more specifically, to managing fabric priorities across heterogeneous server platforms that use the storage area networks.

In a typical data center environment, there are numerous hosts that provide different services to different users. These hosts are often heterogeneous in that the hosts have different hardware architectures (e.g., having central processing units (CPUs) of different architectures) and/or run different operating systems (e.g., z/OS™, Windows™, UNIX™, Linux™, etc.). In some cases, these heterogeneous hosts store data for their services in separate storage devices. The heterogeneous hosts access the data in the storage devices through a network that is dedicated to provide access to the storage devices.

In some cases, a group of heterogeneous hosts share a fabric, which is a group of network forwarding elements (e.g., switches, routers, etc.) that are interconnected to provide access to the storage devices in which the heterogeneous hosts store data. That is, a fabric is communication medium through which the hosts and storage devices to exchange the data and the read/write requests.

SUMMARY

Embodiments include a computer program product, a method, and a system for facilitating heterogeneous hosts to use a range of priority values. According to an embodiment of the present invention, a computer program product for facilitating a plurality of heterogeneous hosts to use a range of priority values is provided. The computer program product comprises a computer readable storage medium having program instructions embodied therewith. The program instructions readable by a processing circuit cause the processing circuit to perform a method. The method retrieves a plurality of priority ranges from a plurality of network forwarding elements shared by a plurality of heterogeneous hosts. The network forwarding elements provides access to a set of storage devices that stores data for the plurality of heterogeneous hosts. The method generates a universal priority range from the plurality of priority ranges. The method maps a plurality of workloads performed by the computer to priority values in the universal priority range. The method sends the universal priority range to at least one host of the heterogeneous hosts. The host maps a plurality of workloads performed by the host to the priority values in the universal priority range. The network forwarding elements forward data for the workloads between the hosts and the storage devices based on the priority values mapped to the workloads.

According to another embodiment of the present invention, a method of facilitating a plurality of heterogeneous hosts to use a range of priority values is provided. The method retrieves a plurality of priority ranges from a plurality of network forwarding elements shared by a plurality of heterogeneous hosts. The network forwarding elements provide access to a set of storage devices that stores data for the plurality of heterogeneous hosts. The method generates, by a computer that comprises one of the heterogeneous hosts, a universal priority range from the plurality of priority ranges. The method maps a plurality of workloads performed by the computer to priority values in the universal priority range. The method sends the universal priority range to at least one other host of the heterogeneous hosts. The other host maps a plurality of workloads performed by the other host to the priority values in the universal priority range. The network forwarding elements forward data for the workloads between the hosts and the storage devices based on the priority values mapped to the workloads.

According to a further embodiment of the present invention, a computer system for facilitating a plurality of heterogeneous hosts to use a range of priority values is provided. The computer system is one of the heterogeneous hosts. The computer system comprises a memory having computer readable instructions, and a processor configured to execute the computer readable instructions. The instructions comprises a set of instructions for retrieving a plurality of priority ranges from a plurality of network forwarding elements shared by a plurality of heterogeneous hosts, the network forwarding elements providing access to a set of storage devices that stores data for the plurality of heterogeneous hosts. The instruction further comprises a set of instructions for generating a universal priority range from the plurality of priority ranges. The instruction further comprises a set of instructions for mapping a plurality of workloads performed by the computer to priority values in the universal priority range. The instruction further comprises a set of instructions for sending the universal priority range to at least one other host of the heterogeneous hosts. The other host maps a plurality of workloads performed by the other host to the priority values in the universal priority range. The network forwarding elements forward data for the workloads between the hosts and the storage devices based on the priority values mapped to the workloads.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

In an embodiment, a group of heterogeneous hosts that share a fabric utilize priority values supported by the network forwarding elements in the fabric when accessing data stored in storage devices through the fabric. In an embodiment, one of the heterogeneous hosts is configured to gather ranges of priority values from network forwarding elements in the fabric that provide access to storage devices that store data for the host. The host generates a universal range of priority values for the fabric, from the ranges of priority values gathered. The host shares this universal range of priority values for the fabric with other hosts in the group.

In an embodiment, the host is also configured to allow a user (e.g., a host administrator) to specify completion and performance requirements for each of the workloads (e.g., a software application) that the host executes for the user. In an embodiment, the host maps the workloads to the priority values of the universal priority range, using the specified completion and performance requirements for the workloads. When the host exchanges data for the workloads with the storage devices in order to write or read the data to and from the storage devices, the network forwarding elements forward the data between the host and the storage devices based on the priority values.

Figure 1:
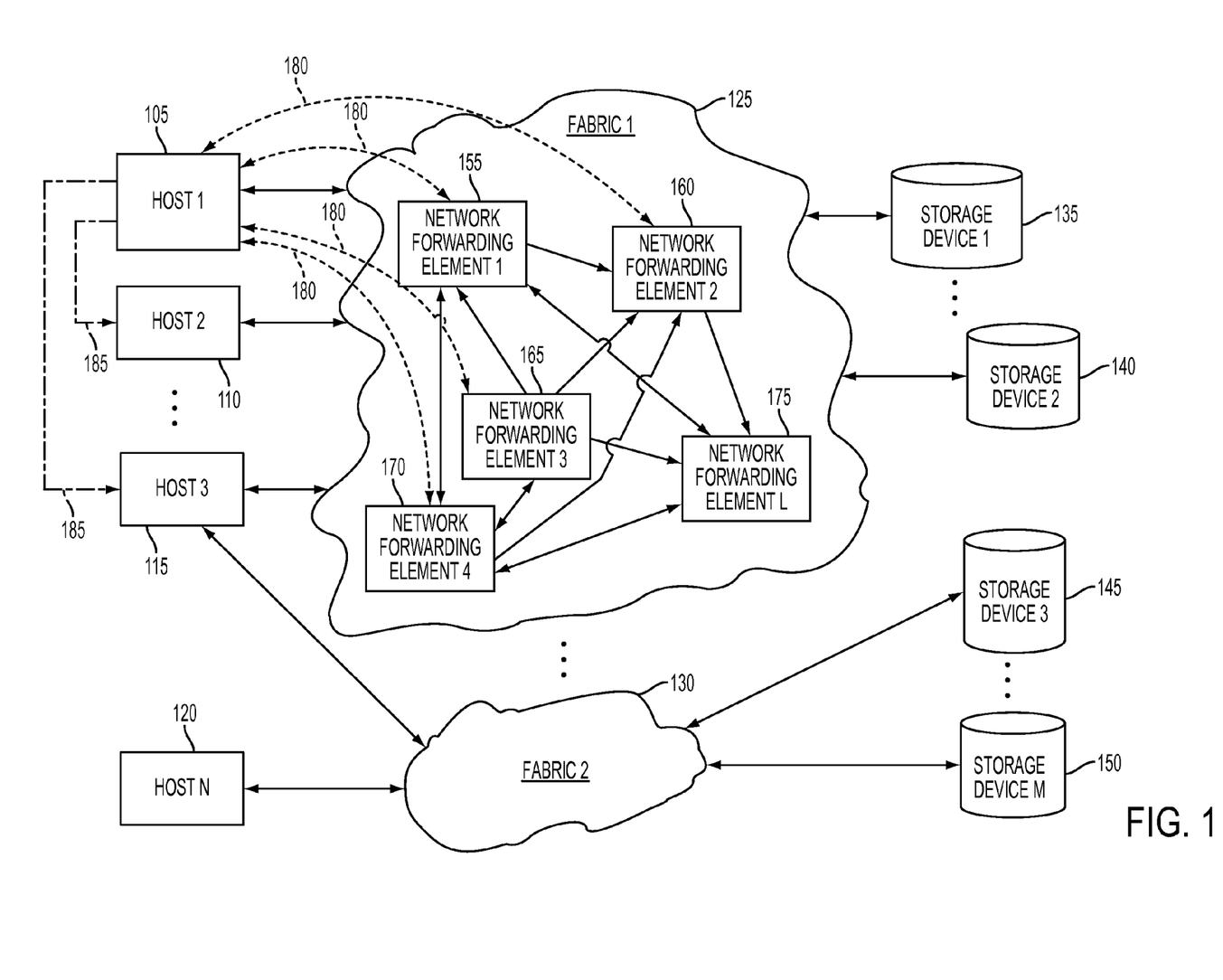
FIG. 1 depicts an exemplary data center environment in accordance with an embodiment.

FIG. 1 illustrates an exemplary data center environment in accordance with an embodiment. Specifically, FIG. 1 illustrates hosts 105-120, fabrics 125 and 130, and storage devices 135-150. The hosts 105-120 store their data in storage devices 135-150. The fabrics 125 and 130 provide the hosts 105-120 with access to the storage devices 135-150.

In one embodiment, each of the fabrics 125 and 130 is a group of network forwarding elements that are interconnected to provide access to a set of storage devices. In an embodiment, the fabrics 125 and 130 may be storage area network (SAN) fabrics, or local area network (LAN) fabrics, or a combination of SAN and LAN fabrics. In this example, the fabric 125 includes network forwarding elements 155-175. Other network forwarding elements of the fabric 125 and the network forwarding elements of the fabric 130 are not depicted for the simplicity of illustration.

The network forwarding elements include switches, routers, middleboxes, etc. that receive data from the hosts or the storage devices connected to the fabric. The network forwarding elements forward the data to the storages devices or the hosts. Some network forwarding elements (e.g., the network forwarding element 155) interface directly with the hosts and the storage devices. Some of the network forwarding elements (e.g., the network forwarding element 165) forward data between other network forwarding elements only and do not interface directly with the hosts and the storage devices. In an embodiment, the network forwarding elements include Fibre Channel switches that support Fibre Channel Protocol (FCP), Enterprise System Connection over Fibre Channel (FICON) protocol, and other protocols that Fibre Channel switches support.

In an embodiment, the network forwarding elements support priority ranges. The network forwarding elements use the priority ranges to prioritize the data being forwarded when there is congestion in the fabric to which these network forwarding elements belong. For example, the network forwarding elements forward data with higher priority values (i.e., with higher priorities) before the network forwarding elements forward data with lower priority values (i.e., with lower priorities). Different network forwarding elements manufactured by the same or different vendors (e.g., Cisco™, Brocade™, etc.) may support different ranges of priority values or may not support any priority ranges.

The storage devices 135-150 include virtual storage systems and distributed storage systems manufactured by the same or different vendors (e.g., IBM™, EMC™, Hitachi™, etc.). The storage devices 135-150 receive read/write requests from the hosts 105-120 through the fabrics 125 and 130, and store, modify or provide the stored data accordingly. In this example, the storage devices 135 and 140 are accessed through the fabric 125, and the storage devices 145 and 150 is accessed through the fabric 130. In an embodiment, one or more fabrics (not shown) in addition to the fabric 125 may be used to access the storage devices 135 and 140 for high availability (HA). Likewise, one or more fabrics (not shown) in addition to the fabric 130 may be used to access the storage devices 145 and 150.

In an embodiment, the hosts 105-120 are heterogeneous in that they may run different operating systems (e.g., z/OS™, Windows™, UNIX™, Linux™, etc.) and/or have different hardware architectures. For instance, the hosts 105-120 may be mainframe computers that each runs one or more server instances (not shown). The hosts 105-120 may be blade servers that each houses multiple server blades, each of which may run one or more server instances. The servers or server instances in the same host or different hosts may also be heterogeneous. Moreover, the host 105-120 may have logical partitions (LPARs), and the LPARs in the same host may be heterogeneous, e.g., by running different operating systems. The hosts 105-120 may also run hypervisors to provision virtual machines (VMs), and the VMs in the same host may be heterogeneous.

In an embodiment, a host is configured to utilize the priority ranges that the network forwarding elements in the fabric support. More specifically, the host obtains priority ranges from the network forwarding elements in a fabric. In an embodiment, the host may use in-band message communication channels or out-of-band message communication channels to request and obtain priority ranges from individual network forwarding elements. The host then generates a universal priority range for the fabric. In an embodiment, the host sends this universal priority range to other hosts that share the same fabric but are not capable of obtaining the priority ranges from the network forwarding elements in the fabric (e.g., due to hardware or software reasons). In an embodiment, the host generates a universal priority range for each of all fabrics that the host uses and distributes the universal priority range along with the fabric identifiers to other hosts that share the fabrics but are incapable of obtaining and generating priority ranges.

With the universal priority range, the hosts can map the workloads performed by the servers or the server instances in the hosts to the priority values of the universal priority range. The data for the workloads carry the priority values as they are being forwarded by the network forwarding elements, and the network forwarding elements use the priority values assisted with the data when forwarding the data in a congested condition. A more detailed description of generating the universal priority range for a fabric will be described further below by reference to FIG. 2.

In this example, the host 105 is configured to obtain the priority ranges from the network forwarding elements 155-170 of the fabric 125 as indicated by the arrowed dotted lines 180. The network forwarding element 175 does not support a priority range. The host 105 processes the obtained priority ranges to generate a universal priority range (not shown) for the fabric 125. The host 105 sends the universal priority range 255 to the hosts 110 and 115, which are incapable of obtaining priority ranges from the network forwarding elements of the fabric 125. The host 105 does not send the universal priority range for the fabric 125 to the host 120 because the host 120 does not use the fabric 125. The hosts 105-115 map the workloads performed by the servers or the server instances (not shown) running in the hosts to the priority values of the universal priority ranges. The hosts 105-115 send the data to the storage devices 135-145 through the fabric 1. The network forwarding elements 155-175 forward the data to the storage devices 135-145. When there is data congestion in the fabric 125, the network forwarding elements 155-170 use the priority values indicated by the data. The network forwarding element 175, which does not support a priority range, forwards the data without prioritizing the data.

Figure 2:
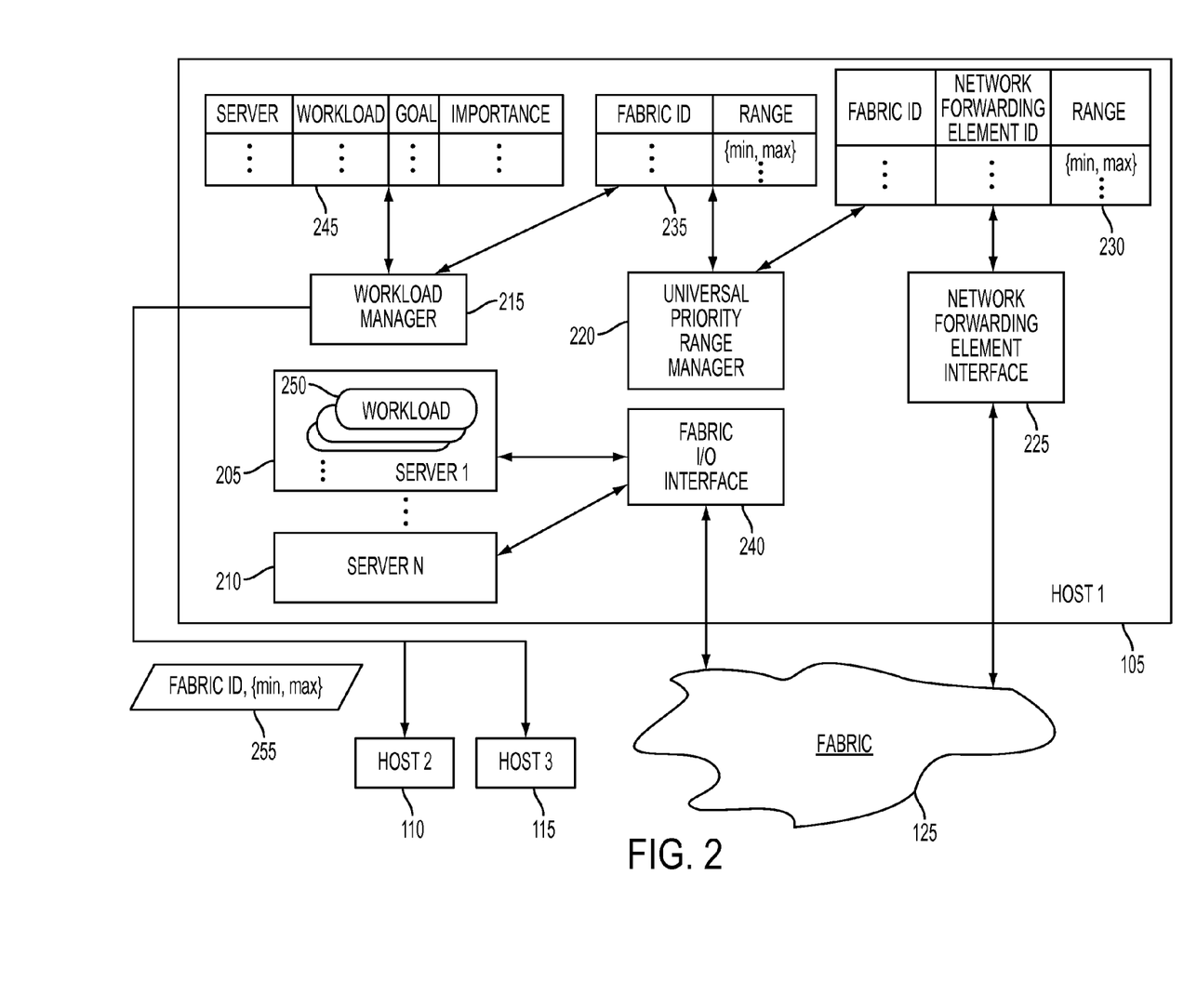
FIG. 2 depicts a block diagram of a host that is configured to obtain priority ranges from a fabric and generate a universal priority range in accordance within an embodiment.

FIG. 2 illustrates a block diagram of a host that is configured to obtain priority ranges from a fabric and generate a universal priority range in accordance within an embodiment. Specifically, FIG. 2 illustrates the host 105 in detail. FIG. 2 also illustrates the hosts 110 and 115, and the fabric 125. As shown, the host 105 includes servers 205 and 210, a workload manager 215, a universal priority range manager 220, a network forwarding element interface 225, and a fabric input/output (I/O) interface 240.

The network forwarding element interface 225 gathers priority ranges from network forwarding elements of all the fabrics that the host 105 uses to access the storage devices. In an embodiment, the network forwarding element interface 225 sends requests for priority ranges to all network forwarding elements of all the fabrics to which the host is connected. In return, the network forwarding element interface 225 receives the priority ranges from those network forwarding elements that support priority ranges.

In an embodiment, the network forwarding element interface 225 sends out the requests as the host 105 starts and when a network forwarding element is added to or removed from a fabric. In an embodiment, the network forwarding element interface 225 sends and receives the requests and the returning priority ranges through in-band message communication channel. Alternatively or conjunctively, the network forwarding element interface 225 sends and receives the requests and the priority ranges through out-of-band message communication channels.

In an embodiment, the network forwarding element maintains the obtained priority ranges in a table 230. The table 230 includes fabric identifiers (e.g., world-wide port names), network forwarding element identifiers, and priority ranges. In an embodiment, a priority range is defined as a minimum priority value (i.e., the lowest priority) and a maximum priority value (i.e., the highest priority) that the corresponding network forwarding element supports.

The universal priority range manager 220 generates a universal priority range for each of the fabrics to which the host 105 is connected. In an embodiment, the universal priority range manager 220 obtains the priority ranges of individual network forwarding elements in a fabric from the table 230, and generates a universal priority range for the fabric. Specifically, in an embodiment, the priority range manager 220 identifies the smallest priority value of the maximum priority values for the network forwarding elements and sets the maximum priority value of the universal priority range to this smallest priority value of the set of maximum priority values. The priority range manager 220 also identifies the largest priority value of the minimum priority values for the network forwarding elements and sets the minimum priority value of the universal priority range to this largest priority value of the set of minimum priority values. In this manner, the universal priority range is defined to be a range of priority values that any of the network forwarding elements of the fabric, which support priority ranges, supports.

In an embodiment, the universal priority range manger 220 monitors the table 230 in order to determine whether it is necessary to update a universal priority range for a fabric when a network forwarding element is added to or removed from a network forwarding element. That is, when the smallest maximum priority value or the largest minimum priority value for the network forwarding elements in the fabric is changed because of the addition or removal of the network forwarding element, the universal priority range manager 220 updates the universal priority range for the fabric accordingly.

In an embodiment, the universal priority range manager 220 maintains the universal priority ranges of the fabrics in a table 235. The table 235 includes fabric identifiers and universal priority ranges for the fabrics to which the host 105 is connected. In an embodiment, a universal priority range is defined as a set of values between the maximum and minimum priority values for a fabric.

The workload manager 215 manages workloads performed by the servers or server instances in the host 105. The workloads often have different, often competing completion and resource requirements. The workload manager 215 balances these requirements in order to make the best use of the resources (e.g., central processing units (CPUs), memory, I/O devices, etc.) of the host 105. Specifically, in an embodiment, the workload manager 215 manages the workloads based on the requirements specified by the users (e.g., administrators) of the servers. For example, the workload manager 215 allows a user to assign a performance goal and an importance value to a workload. In an embodiment, the performance goal is a desired level of service (e.g., a speed at which the workload is to be processed, an amount of time to complete the workload, etc.), which the workload is to meet. The workload manager 215 monitors the current status of the workloads to determine whether the workloads are meeting the performance goal. The workload manager 215 allocates more resources to those workloads that do not meet the performance goals. The workload manager 215 uses the importance values when, for example, different workloads with similar performance goals compete for the resources. In such case, the workload with higher importance value would get more resources. In an embodiment, the work manager 215 categorizes the workloads into different workload classes and allows the user to assign performance goals and importance values at a class level.

In an embodiment, the workload manager 215 utilizes the universal priority range to balance the requirements. Specifically, in an embodiment, the workload manger 215 maps the workloads to the priority values of the universal priority ranges based on the performance goals and the importance values assigned to the workloads. The workload manager 215 also updates the mapping based on the current status of the workloads. For example, the workload manager 215 assigns a higher priority value to a workload that is not meeting its performance goal and has a higher importance value. Conversely, the workload manager 215 assigns a lower priority value to a workload that is meeting its performance goal and has a lower importance value.

The fabric I/O interface 240 receives data for the workloads from the servers 205 through 210 that each performs one or more of the workloads. The data is to be stored in the storage devices (not shown). The fabric I/O interface 240 formats the data in an appropriate protocol for the network forwarding elements in the fabric support. In an embodiment, the fabric I/O interface 240 puts the priority values mapped to the workloads into the data (e.g., into packet headers of the data). The network forwarding elements in the fabric use the priority values to forward the data towards the storage devices (not shown). Data from the storage devices, e.g., in response to a read request, carries priority values that the storage devices put into the data, while being forwarded by the network forwarding elements. The fabric I/O interface 240 sends the data from the storage devices to the corresponding workloads performed by the servers 205 through 210.

For a particular fabric to which the host 105 is connected, the host 105 sends the universal fabric range along with the fabric identifier for the particular fabric to the other hosts, if any, that are connected to the particular fabric. Specifically, in an embodiment, the workload manager 215 communicates with other workload managers (not shown) of the other hosts to send the universal priority range. The work managers for the other hosts use the priority range to balance the workloads performed by the servers (not shown) running in the other hosts. In an embodiment, the host 105 sends all of the universal priority ranges and the corresponding fabric identifiers that the host generated to other hosts with which the host 105 communicates. In such an embodiment, the hosts that receive the universal priority ranges use the universal priority ranges of only those fabrics to which those hosts are connected.

Figure 3:
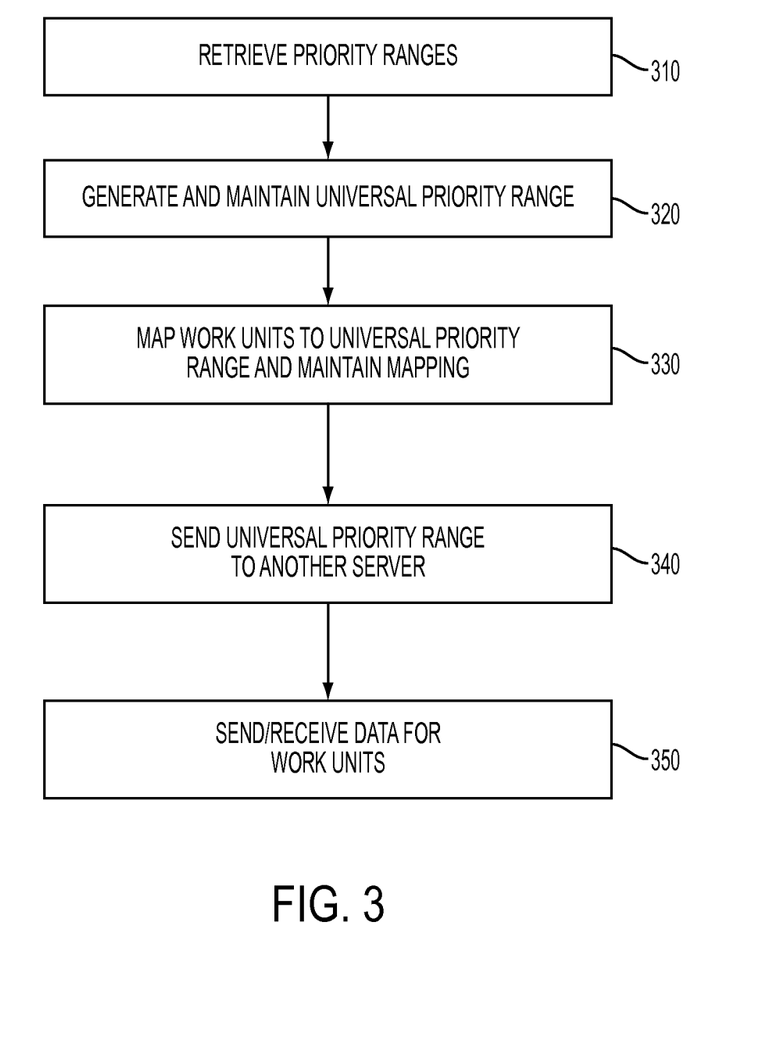
FIG. 3 depicts a process flow for generating and distributing a universal priority range in accordance with an embodiment.

An example operation of the host will now be described by reference to FIGS. 1, 2 and 3. FIG. 3 depicts a process flow for generating and distributing a universal priority range. In an embodiment, the process flow shown in FIG. 3 is performed by host 105.

At block 310, the host 105 retrieves priority ranges from network forwarding elements of a fabric to which the host 105 is connected. In an embodiment, the host 105 sends requests for priority ranges to network forwarding elements 155-175 of the fabric 125. In return, the host 105 receives the priority ranges from the network forwarding elements 155-170 that support priority ranges. In an embodiment, a priority range received is in the form of a minimum priority value and a maximum priority value.

At block 320, the host 105 generates and maintains a universal priority range for the fabric 125. In an embodiment, the host 105 identifies the smallest priority value (i.e., the lowest priority) of the maximum priority values of the priority ranges retrieved at block 310 and sets the maximum priority value of the universal priority range to this smallest priority value. The host 105 also identifies the largest priority value (i.e., the highest priority) of the minimum priority values of the priority ranges and sets the minimum priority value of the universal priority range to this largest priority value. In an embodiment, when the largest minimum priority value or the smallest maximum priority value of the priority ranges changes due to an addition or a removal of a network forwarding element from the fabric 125, the host 105 updates the universal priority range for the fabric 125.

At block 330, the host 105 maps workloads 250 performed by the servers 205 through 210 to the priority values of the universal priority range based on the performance goals and the importance values assigned to the workloads. In an embodiment, the host 105 also maintains the mapping based on the current status of the workloads. For example, the host 105 assigns a higher priority value to a workload that is not meeting its performance goal and has a higher importance value. Conversely, the 105 assigns a lower priority value to a workload that is meeting its performance goal and has a lower importance value.

At block 340, the host 105 sends the universal fabric range 255 along with the fabric identifier for the particular fabric to the host 110 and 115. The hosts 110 and 115 use the universal priority range to map their workloads to the priority values of the universal priority range.

At block 350, the host 105 sends and receives data for the workloads to and from the storage devices 135 and 140 through the fabric 125. Before sending out the data, the host 105 puts the priority values mapped to the workloads into the data. The network forwarding elements 155-170 in the fabric use the priority values to forward the data towards the storage devices 135 and 140. The network forwarding element 175 ignores the priority values when the network forwarding element 175 receives data with the priority values. The storage devices 135 and 140 also insert the priority values to the data being returned to the host 105.

Technical effects and benefits include that a group of heterogeneous hosts, some of which is not capable of obtaining priority ranges supported by the network forwarding elements, can all use the priority ranges. Moreover, by using a universal priority range for a fabric, the hosts do not have to map the workloads to priority ranges of the individual network forwarding elements. Embodiments of the invention also provide coordination of the priorities across the heterogeneous servers and network forwarding elements and thereby provide a consistent, coordinated use of the priorities across all the platforms.

It is to be noted that, throughout the present disclosure, the terms maximum/minimum priority value, largest/smallest priority value, and higher/lower priority value(s) indicate whether the priorities are maximum/minimum, largest/smallest, and higher/lower. As can be recognized, the adjectives "maximum/minimum," "largest/smallest," and "higher/lower" when modifying "priority value(s)" do not necessarily mean that the numerical values of the priority values are maximum/minimum, largest/smallest, and higher/lower.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for facilitating a plurality of heterogeneous hosts to use a range of priority values, the computer program product comprising:
    a computer readable storage medium having program instructions embodied therewith, wherein the computer readable storage medium is not a transitory signal per se, the program instructions readable by a processing circuit to cause the processing circuit to perform a method comprising:
        retrieving a plurality of ranges of priority values from a plurality of network forwarding elements shared by a plurality of heterogeneous hosts, the network forwarding elements providing access to a set of storage devices that stores data for the plurality of heterogeneous hosts;
        generating a universal priority range from the plurality of ranges of priority values;
        mapping a plurality of workloads performed by the plurality of heterogeneous hosts to priority values in the universal priority range; and
        sending the universal priority range to at least one other host of the plurality of heterogeneous hosts;
    wherein the at least one other host maps a plurality of workloads performed by the at least one other host to the priority values in the universal priority range; and
    wherein the network forwarding elements forward the data for the plurality of workloads between the at least one host and the storage devices based on the priority values mapped to the workloads, wherein data with a higher priority value is forwarded before data with a lower priority value, and wherein the priority values mapped to the workloads are stored in a packet header of the data.

2. The computer program product of claim 1, wherein the retrieving the plurality of priority comprises:
   sending a request for a range of priority values to a network forwarding element; and
   receiving the range of priority values from the network forwarding element.

3. The computer program product of claim 1, wherein the generating the universal priority range comprises:
   setting a maximum priority value of the universal priority range to a minimum priority value of maximum priority values of the range of priority values; and
   setting a minimum priority value of the universal priority range to a maximum priority value of minimum priority values of the range of priority values.

4. The computer program product of claim 1, wherein each of the workloads is associated with a performance goal that quantifies how fast the workload has to be performed by a corresponding host, wherein the mapping the plurality of workloads to the priority values is based on the performance goals associated with the workloads.

5. The computer program product of claim 4, wherein the method further comprises:
   monitoring each workload to determine whether the workload is meeting the performance goal; and
   adjusting the mapping between the workload to the priority value based on determining that the workload is not meeting the performance goal.

6. The computer program product of claim 1, wherein each of the workloads is associated with an importance value that indicates importance of the workload relative to other workloads, wherein the mapping the plurality of workloads to the priority values is based on the importance values of the workloads.

7. The computer program product of claim 1, wherein the network forwarding elements form a fabric, wherein the method further comprises:
   determining whether a network forwarding element is removed from or added to the fabric; and
   based on determining that a network forwarding element is removed from or added to the fabric, updating the universal priority range.

8. The computer program product of claim 1, wherein at least two of the heterogeneous hosts run different operating systems.

9. A computer implemented method of facilitating a plurality of heterogeneous hosts to use a range of priority values, the method comprising:
   retrieving a plurality of ranges of priority values from a plurality of network forwarding elements shared by a plurality of heterogeneous hosts, the network forwarding elements providing access to a set of storage devices that stores data for the plurality of heterogeneous hosts;
   generating, by a computer that comprises one of the heterogeneous hosts, a universal priority range from the plurality of ranges of priority values;
   mapping a plurality of workloads performed by the plurality of heterogeneous hosts to priority values in the universal priority range; and
   sending the universal priority range to at least one other host of the plurality of heterogeneous hosts,
   wherein the at least one other host maps a plurality of workloads performed by the at least one other host to the priority values in the universal priority range, and
   wherein the network forwarding elements forward the data for the plurality of workloads between the at least one host and the storage devices based on the priority values mapped to the workloads, wherein data with a higher priority value is forwarded before data with a lower priority value, and wherein the priority values mapped to the workloads are stored in a packet header of the data.

10. The method of claim 9, wherein the retrieving the plurality of priority comprises:
    sending a request for a range of priority values to a network forwarding element; and
    receiving a range of priority values from the network forwarding element.

11. The method of claim 9, wherein the generating the universal priority range comprises:
    setting a maximum priority value of the universal priority range to a minimum priority value of maximum priority values of the range of priority values; and
    setting a minimum priority value of the universal priority range to a maximum priority value of minimum priority values of the range of priority values.

12. The method of claim 9, wherein each of the workloads is associated with a performance goal that quantifies how fast the workload has to be performed by a corresponding host, wherein the mapping the plurality of workloads to the priority values is based on the performance goals associated with the workloads.

13. The method of claim 12 further comprising:
    monitoring each workload to determine whether the workload is meeting the performance goal; and
    adjusting the mapping between the workload to the priority value based on determining that the workload is not meeting the performance goal.

14. The method of claim 9, wherein each of the workloads is associated with an importance value that indicates importance of the workload relative to other workloads, wherein the mapping the plurality of workloads to the priority values is based on the importance values of the workloads.

15. The method of claim 9, wherein the network forwarding elements form a fabric, wherein the method further comprises:
    determining whether a network forwarding element is removed from or added to the fabric; and
    based on determining that a network forwarding element is removed from or added to the fabric, updating the universal priority range.

16. A computer system for facilitating a plurality of heterogeneous hosts to use a range of priority values, the computer system being one of the heterogeneous hosts, the system comprising:
    a memory having computer readable instructions; and
    a processor configured to execute the computer readable instructions, the instructions comprising:
       retrieving a plurality of ranges of priority values from a plurality of network forwarding elements shared by a plurality of heterogeneous hosts, the network forwarding elements providing access to a set of storage devices that stores data for the plurality of heterogeneous hosts;
       generating a universal priority range from the plurality of ranges of priority values;
       mapping a plurality of workloads performed by the plurality of heterogeneous hosts to priority values in the universal priority range; and
       sending the universal priority range to at least one other host of the plurality of heterogeneous hosts, wherein the at least one other host maps a plurality of workloads performed by the at least one other host to the priority values in the universal priority range, and wherein the network forwarding elements forward the data for the plurality of workloads between the at least one host and the storage devices based on the priority values mapped to the workloads, wherein data with a higher priority value is forwarded before data with a lower priority value, and wherein the priority values mapped to the workloads are stored in a packet header of the data.

17. The computer system of claim 16, wherein the retrieving the plurality of priority comprises:

sending a request for a range of priority values to a network forwarding element; and receiving a range of priority values from the network forwarding element.

18. The computer system of claim 16, wherein the generating the universal priority range comprises:

setting a maximum priority value of the universal priority range to a minimum priority value of maximum priority values of the range of priority values; and setting a minimum priority value of the universal priority range to a maximum priority value of minimum priority values of the range of priority values.

19. The computer system of claim 16, wherein each of the workloads is associated with a performance goal that quantifies how fast the workload has to be performed by a corresponding host, wherein the mapping the plurality of workloads to the priority values is based on the performance goals associated with the workloads.

20. The computer system of claim 19, wherein the instructions further comprise:

monitoring each workload to determine whether the workload is meeting the performance goal; and adjusting the mapping between the workload to the priority value based on determining that the workload is not meeting the performance goal.

\* \* \* \* \*